United States Patent Office 2,939,722
Patented June 7, 1960

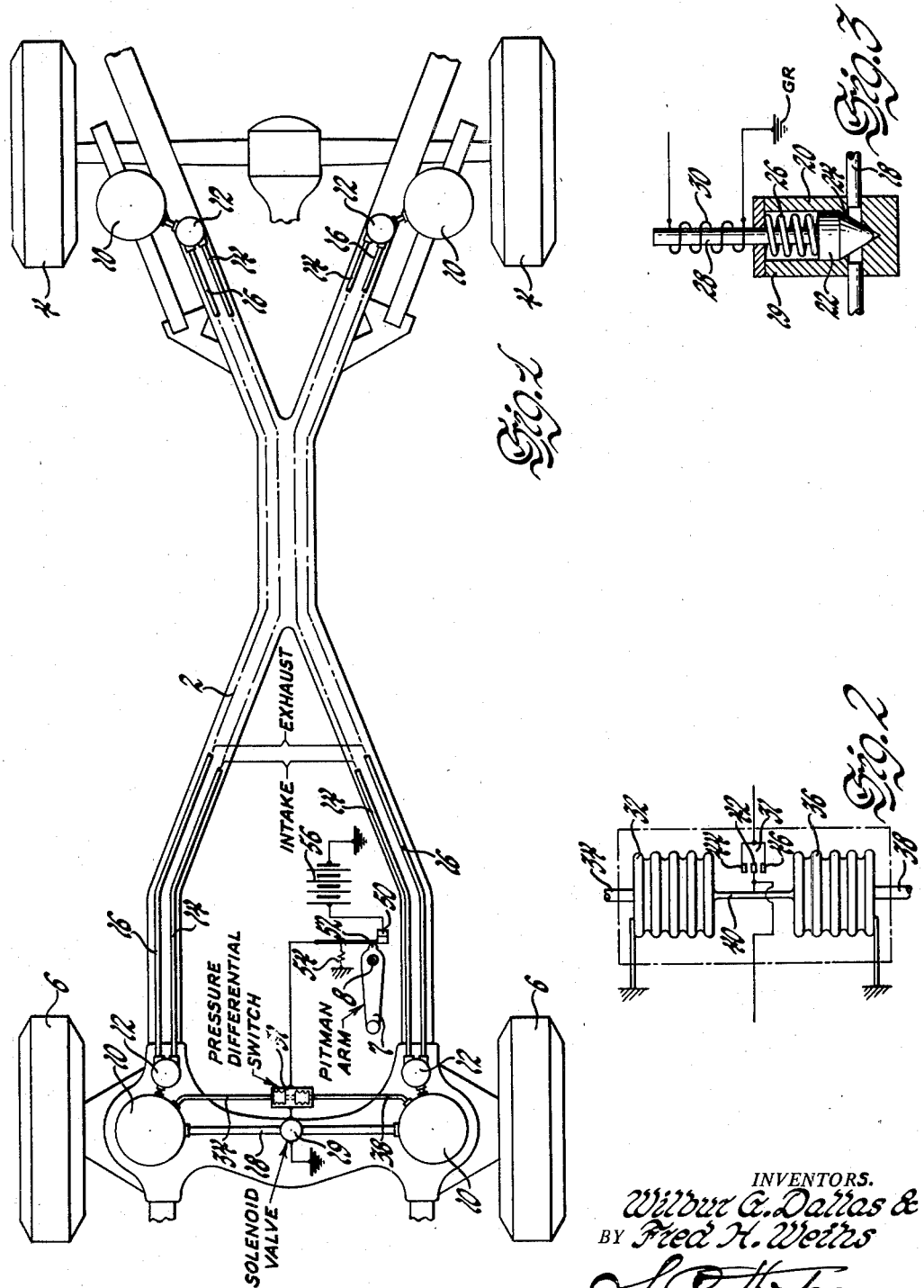

2,939,722

VEHICLE ROLL CONTROL DEVICE WITH STEERING RESPONSIVE OVERRIDE

Wilbur G. Dallas, Ashland, Ohio, and Fred H. Weihs, St. Clair Shores, Mich., assignors to General Motors Corporation, Detroit, Mich., a corporation of Delaware Filed Oct. 28, 1957, Ser. No. 692,627

4 Claims. (Cl. 280—112)

This invention relates generally to vehicles which include a fluid type of suspension between sprung and unsprung portions thereof. The invention is particularly concerned with that type of fluid suspension which includes oppositely disposed fluid springs individually inflatable and deflatable by so-called leveling valves in response to predetermined deflections between sprung and unsprung vehicle portions adjacent the respective springs which tend to maintain the vehicle level and the deflection more or less constant regardless of the loading of the vehicle either statically or dynamically. Vehicles which include the type of suspension with which the present invention is concerned, when taking curves, tend to roll due to centrifugal force. This causes the springs of the vehicle on the outboard side to pump up and those on the inboard side toward the center of curvature to deflate. Thus when the vehicle comes out of the curve the springs on one side of the vehicle will be at a higher pressure than those on the other side resulting in a listing or heeling of the vehicle until the leveling valves of the individual springs can act to trim the vehicle and correct the unnatural attitude.

The present invention has been provided in combination with a suspension of the type outlined herein to more quickly correct any unnatural attitude resulting from the vehicle moving into and out of curves by providing a unique equalization of the pressures in the oppositely disposed fluid springs just as the vehicle comes out of the curve and again assumes a straight path. This has been accomplished by providing one or more valved connections between the oppositely disposed fluid springs which are responsive to predetermined pressure differentials between the springs at a small or no turning angle of the vehicle wheels to place the oppositely disposed springs in direct communication with each other.

For a fuller understanding of the invention and the objects thereof, reference may be made to the accompanying detailed description taken in conjunction with the drawing, in which:

Figure 1 is a schematic view in plan of a wheeled vehicle chassis showing a fluid suspension of the type outlined above including the unique invention in combination therewith.

Figure 2 is a more detailed schematic showing of the pressure operated switch which is sensitive to pressure differences between the springs to cause closure of sets of the contacts thereof.

Figure 3 is an enlarged view with parts in section and broken away illustrating in detail the solenoid operated valve in the direct connection between the oppositely disposed fluid springs of the vehicle.

Referring now to the drawing, a vehicle is shown which includes a frame 2 supported a pair of rear wheels 4 and a pair of turnable front wheels 6 which are controlled by a suitable steering mechanism, the pitman arm of which is shown and so labeled and further identified by a numeral 7. The pitman arm 7 is moved in a conventional manner by means of a shaft 8 also forming a part of the vehicle steering mechanism.

Located adjacent each of the four wheels of the vehicle is a fluid spring 10 which is conventional and which may be inflated or deflated in response to deflection changes between the sprung portion of the vehicle and the unsprung portion supported on the springs 10 adjacent the respective spring, which deflections are sensed by suitable leveling valves 12 of which there is one associated with each of the springs 10. Each of the leveling valves 12 is provided with suitable intake or high pressure conduits 14 connected thereto which lead from a high pressure tank or compressor not shown. The leveling valves are also connected to a low pressure tank or exhaust side by means of conduits 16. The operation of the fluid springs 10 and their respective leveling valves 12 is conventional. If, for example, the deflection between sprung and unsprung portions of the vehicle is too great adjacent one of the springs the associated leveling valve will sense this and eliminate a portion of the air pressure in the associated spring until the deflection returns to that selected for operation of the vehicle. On the other hand if the deflection is too little, the associated leveling valve 12 will allow high pressure air to enter the associated spring so as to increase the deflection back to normal.

Turning again to the drawing, it will be observed that in the case of the oppositely disposed springs 10 in the front end of the vehicle there extends therebetween a communicating connection 18 which includes a solenoid valve so labeled and also identified by numeral 19. The solenoid valve 19 which is shown in more detail in Fig. 3 includes a housing 20, and a valve 22 tending to be maintained on its seat 24 by a spring 26 which when so seated closes off communication between the springs 10 at the front of the vehicle through the pipe-like connection 18. The solenoid valve 19 also includes a solenoid 28 having an energizing winding 30, one terminal end of which is connected to ground GR. Also connected between the springs 10 at the front end of the vehicle is a pressure differential switch so labeled and indicated by a numeral 31 which includes a flexible bellows 32 connected to one of the springs 10 by piping 34 and a second oppositely disposed bellows 36 connected to the other of the springs 10 by piping 38. Extending between the bellows 32 and 36 is a rod or stem 40 carrying a movable electric contact 42 which makes contact with the stationary contacts 44 and 46 of the pressure differential switch 31 when pressure differentials above a certain pressure difference between the pressures in the springs 10 at the front end of the vehicle occur. The pressure differential switch 31 is connected in series with the energizing winding 30 of the solenoid operated valve 19. A second switch 50 is provided on the vehicle which includes a pair of contacts normally maintained closed within a certain range of turning of the front wheels 6 by the pitman arm 7. As shown in Fig. 1 the pitman arm 7 is provided with a small nodule 52 which maintains the contacts of switch 50 closed, as long as the pitman arm is not turned too far in either direction from its position in which the vehicle would be moving in a straight path. If, however, the pitman arm is moved too far from its straight path position, the small spring 54 will cause the contacts of switch 50 to open. The switch 50, switch 31, energizing winding, and solenoid 28 are all connected in series with a suitable voltage source such as a battery 56 so that the solenoid operated valve is not energized to its open position unless both switches 31 and 50 are closed.

The operation of the vehicle roll control portion of the suspension which comprises this invention is as follows: Assuming that the vehicle moves into a curve which causes the pitman arm to move far enough to open the contacts of switch 50 but that the centrifugal force is sufficient to cause a pressure differential between springs 10 which closes one of the sets of contacts of the switch 31. Under such conditions the valve 22 will remain closed and nothing will happen except that the leveling valve 12 on the outboard side of the vehicle away from the center of curvature will inflate its associated spring 10 whereas the leveling valve on the inboard side of the vehicle closest to the center of curve will deflate its associated spring 10. As the vehicle begins to come out of the curve, however, the pitman arm 7 will move within the range to close the contacts of switch 50 thereby energizing the solenoid operated valve 19 to place the oppositely disposed springs 10 in direct communication with each other thereby equalizing the pressures in these two springs so that the vehicle will not assume an unnatural attitude as it comes out of the curve as a result of the spring 10 on the outboard side of the vehicle being "pumped up" and the spring on the inboard side being deflated.

Although only one such device has been shown at the front end of the vehicle in the present example, it will be appreciated that if necessary or desirable a similar device could be provided at the rear end in the event that one such device was insufficient to adequately correct the unnatural attitude of the vehicle as it comes out of the curve. It is also realized that even though the vehicle is moving along a straight path momentary pressure differentials may occur because of bumps, etc., which could cause equalization of the pressures in the oppositely disposed springs. This may be adequately taken care of by suitably damping the movable contacts of the pressure switch 31. It should be appreciated that although the pressure differential of the mechanism cooperates with the steering mechanism to provide a more desirable vehicle roll control compensating mechanism, each of such devices acting individually might also be used to compensate for such condition and avoid the unnatural attitude of the vehicle as it comes out of a curve.

We claim:

1. In a vehicle including a fluid suspension having oppositely disposed fluid springs individually inflatable and deflatable in response to predetermined deflections between sprung and unsprung vehicle portions adjacent the respective spring and a steering mechanism, a valved connection between said springs, and means responsive to pressure differences of said springs and operation of said mechanism to a straight ahead recovery position operable to control said valved connection so as to place said springs in communication.

2. In a vehicle fluid suspension including oppositely disposed fluid springs, a normally closed fluid connection between said springs, steering mechanism, means responsive to certain pressure differentials of said springs to open said connection, and means responsive to said steering mechanism overriding said first mentioned means except when said steering mechanism is oriented to a position directing the vehicle in a substantially straight path of travel.

3. In a vehicle including an unsprung portion having steerable wheels thereon and oppositely disposed fluid springs supporting a sprung portion thereon, each of said fluid springs being individually inflatable and deflatable in response to predetermined deflections between said sprung and unsprung vehicle portions adjacent such spring, steering means on said vehicle for turning said wheels, and a valved connection between said springs operable responsive to certain pressure differences of said springs, and means responsive to operation of said steering means beyond a predetermined range of movement to disable operation of said pressure differential responsive valve whereby direct communication between said springs through said valved connection occurs only upon return of said steering mechanism to the straight ahead position.

4. A vehicle comprising an unsprung portion supported by steerable wheels, steering means including a pitman arm for turning said wheels, oppositely disposed fluid springs on said unsprung portion supporting a sprung portion thereon, each of said fluid springs being individually inflatable and deflatable in response to predetermined deflections between said sprung and unsprung vehicle portions adjacent such spring, a communicating connection between said springs including a solenoid operated valve having an energizing winding, a pressure switch in series with the energizing winding of said solenoid having normally open contacts closable upon a predetermined pressure differential between the pressures of said springs, a second switch normally maintained closed by said steering mechanism within a predetermined range thereof and in series with the energizing winding of said solenoid valve and the contacts of said pressure switch, and a voltage source in series with the contacts of said switches and said energizing winding whereby in response to predetermined pressure differentials between said springs within a limited range of movement of said steering mechanism said solenoid valve is energized by closure of said switches to place said springs in direct communication with each other.

References Cited in the file of this patent

UNITED STATES PATENTS

| 2,115,159 | Dupuy | Apr. 26, 1938 |
| 2,650,107 | Monnig | Aug. 25, 1953 |
| 2,787,474 | Brueder | Apr. 2, 1957 |